US006953180B1

(12) United States Patent
Ruvalcaba et al.

(10) Patent No.: US 6,953,180 B1
(45) Date of Patent: Oct. 11, 2005

(54) ANCHORING DEVICE FOR AN UMBRELLA

(76) Inventors: Jose Luis Ruvalcaba, 14702 Ibex Ave., Norwalk, CA (US) 90650; Raul Ruvalcaba, 13146 Stern Ave., La Mirada, CA (US) 90638

( * ) Notice: Subject to any disclaimer, the term of this patent is extended or adjusted under 35 U.S.C. 154(b) by 36 days.

(21) Appl. No.: 10/447,374

(22) Filed: May 29, 2003

Related U.S. Application Data

(63) Continuation-in-part of application No. 09/899,976, filed on Jul. 6, 2001, now abandoned.

(51) Int. Cl.$^7$ .................. F16M 13/00; A47B 97/00
(52) U.S. Cl. .................. 248/530; 248/508; 248/845; 135/118
(58) Field of Search .................. 248/530, 845, 248/546, 345, 684, 507–509, 519, 523, 539, 248/126, 156, 514–516; 135/15.1, 16, 98, 135/116, 118; 52/155

(56) References Cited

U.S. PATENT DOCUMENTS

| | | | |
|---|---|---|---|
| 2,643,843 A | | 6/1953 | Brown |
| 3,570,793 A | | 3/1971 | Shackel |
| 3,823,785 A | | 7/1974 | Toliver |
| 4,148,162 A | | 4/1979 | Goodrich |
| 4,753,411 A | * | 6/1988 | Lechner et al. ............ 248/533 |
| 4,850,564 A | * | 7/1989 | Padin ........................ 248/533 |
| 5,046,699 A | | 9/1991 | Perreault et al. |
| 5,065,975 A | * | 11/1991 | Giles ......................... 248/545 |
| 5,123,623 A | * | 6/1992 | McNamara ................. 248/545 |
| 5,396,916 A | | 3/1995 | Boissonnault |
| D359,437 S | | 6/1995 | Bilotti |
| 5,535,978 A | | 7/1996 | Rodriguez et al. |
| 5,588,630 A | * | 12/1996 | Chen-Chao ................. 248/514 |
| 5,740,827 A | * | 4/1998 | Swarringim ................ 135/118 |
| 6,082,157 A | * | 7/2000 | Boyce ........................ 70/58 |
| 6,088,946 A | | 7/2000 | Simmons |
| 6,279,880 B1 | * | 8/2001 | Hawks, Jr. .................. 256/67 |
| 6,308,468 B1 | * | 10/2001 | Caruso ....................... 52/165 |

* cited by examiner

*Primary Examiner*—Leslie A. Braun
*Assistant Examiner*—Tan Le

(57) ABSTRACT

An anchoring device for an umbrella for driving and securing the umbrella to a ground surface such as, for example, one comprised of sand or dirt. The anchoring device for an umbrella includes a base plate that has an upper side and a lower side. A stake member mounted to the lower side of the base plate is provided for removably penetrating the surface. A tubular member is coupled to the upper side of the base plate. The tubular member includes a first end, a second end and a peripheral wall extending between the first and second ends of the tubular member. The second end of the tubular member includes a bore extending therein toward the first end of the tubular member. In one embodiment, an end of the shaft of the umbrella is removably insertable in the bore.

5 Claims, 7 Drawing Sheets

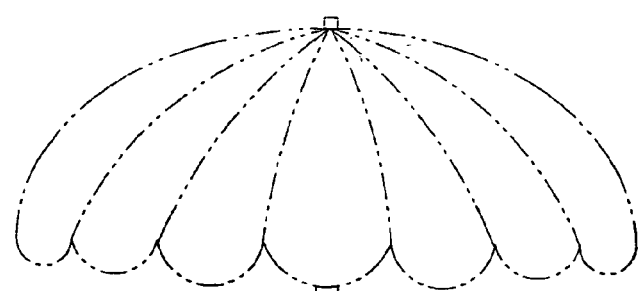
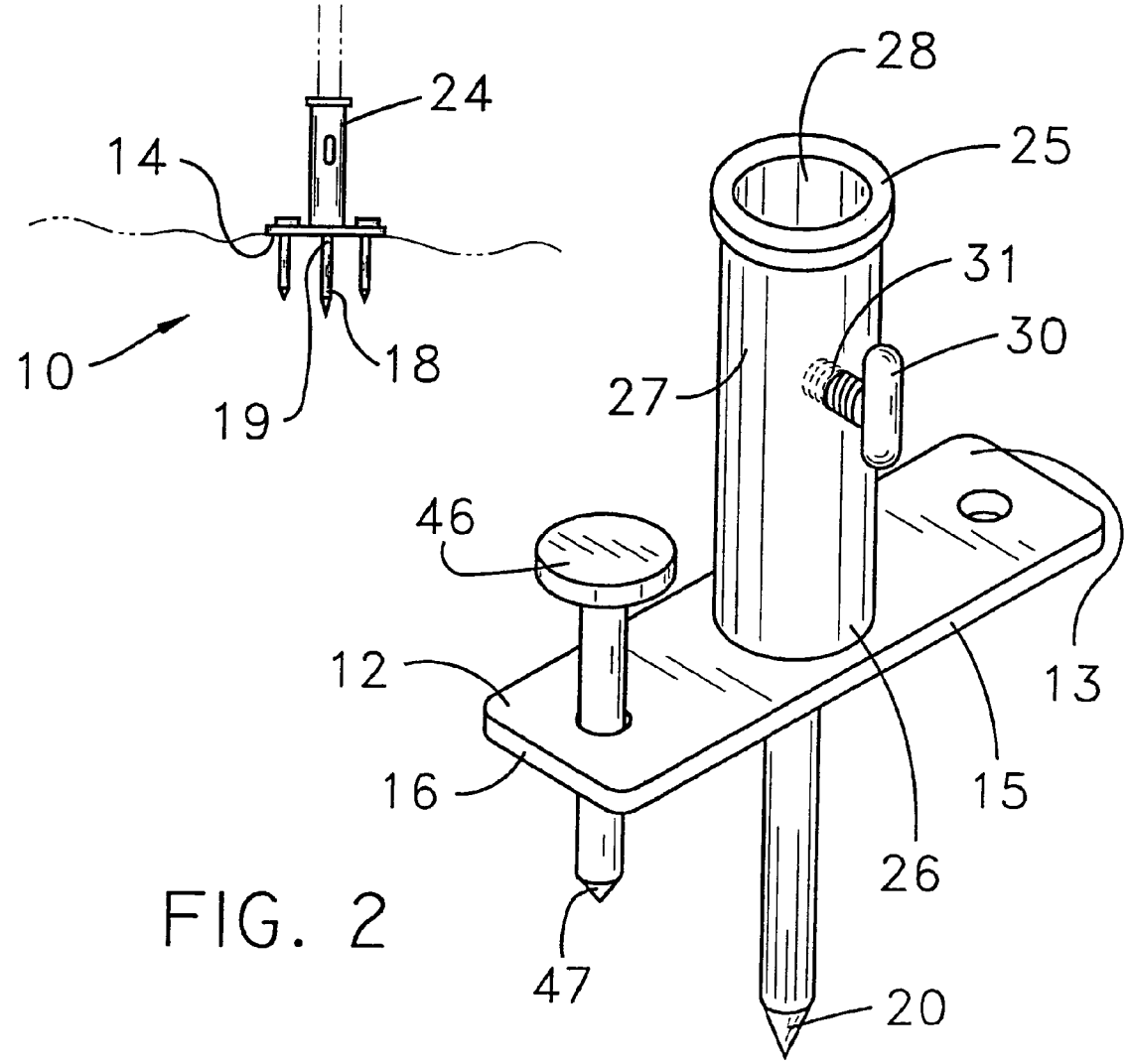

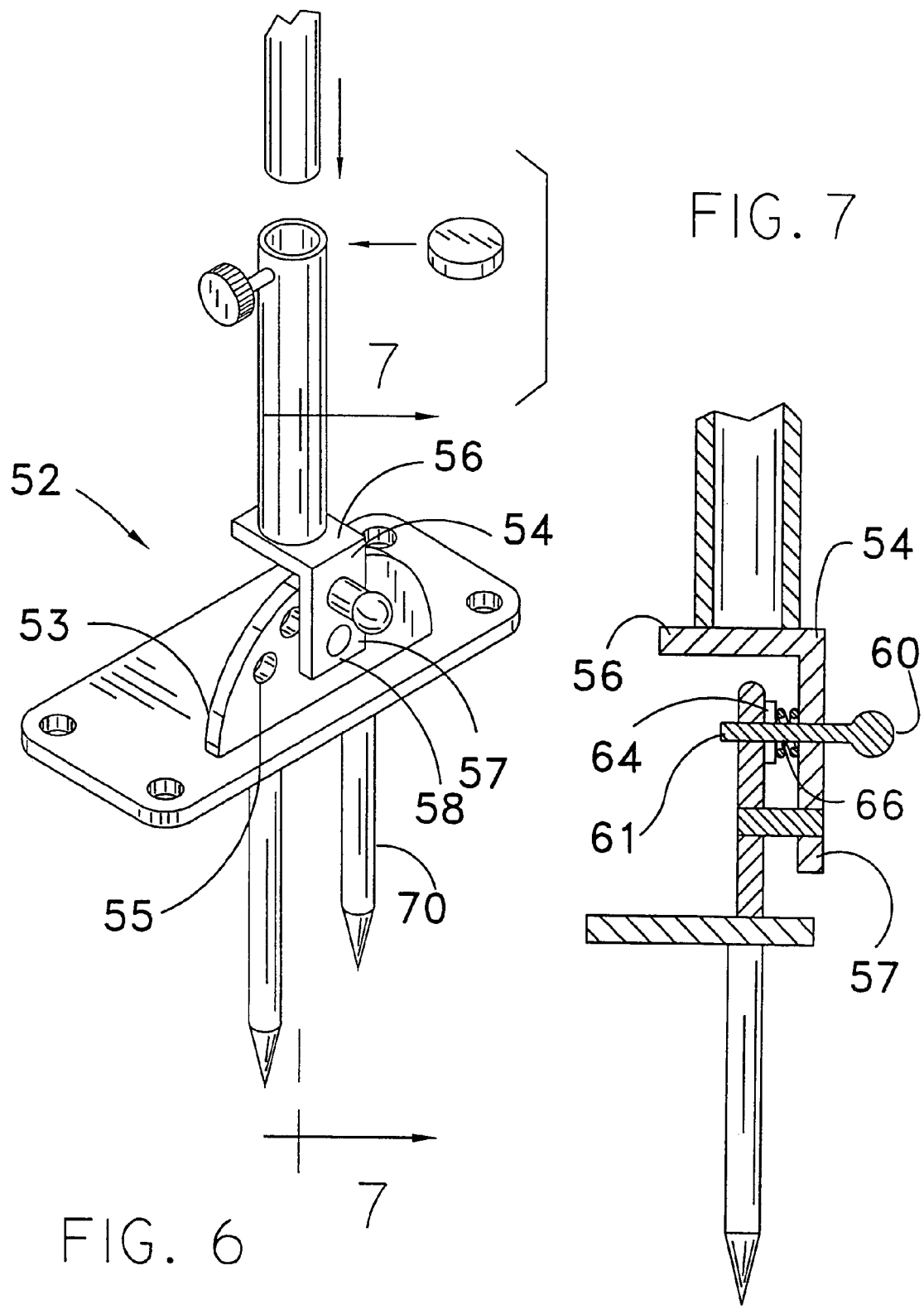

ANCHORING DEVICE FOR AN UMBRELLA

CROSS REFERENCE TO RELATED APPLICATION

This application is a continuation-in-part of application Ser. No. 09/899,976, filed Jul. 6, 2001, now abn.

BACKGROUND OF THE INVENTION

1. Field of the Invention

The present invention relates to anchoring devices and more particularly pertains to a new anchoring device for an umbrella for driving and securing the umbrella to a ground surface such as, for example, one comprised of sand or dirt.

2. Description of the Prior Art

The use of anchoring devices is known in the prior art. More specifically, anchoring devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,046,699; U.S. Pat. No. 2,643,843; U.S. Pat. No. 5,535,978; U.S. Pat. No. 5,396,916; U.S. Pat. No. 3,823,785; and U.S. Pat. No. Des. 359,437.

While these devices fulfill their respective, particular objectives and requirements, the aforementioned patents do not disclose a new anchoring device for an umbrella. The inventive device includes a base plate that has an upper side and a lower. A stake member mounted to a central portion of the lower side of the base plate is provided for removably penetrating the surface. A tubular member is coupled to the upper side of the base plate. The tubular member includes a first end, a second end and a peripheral wall extending between the first and second ends of the tubular member. The second end of the tubular member includes a bore extending therein toward the first end of the tubular member. In one embodiment, an end of the shaft of the umbrella is removably insertable in the bore.

In these respects, the anchoring device for an umbrella according to the present invention substantially departs from the conventional concepts and designs of the prior art, and in so doing provides an apparatus primarily developed for the purpose of driving and securing the umbrella to a surface such as, for example, sand, or dirt.

SUMMARY OF THE INVENTION

In view of the foregoing disadvantages inherent in the known types of anchoring devices now present in the prior art, the present invention provides a new anchoring device for an umbrella construction wherein the same can be utilized for driving and securing the umbrella to a surface such as, for example, sand, or dirt.

The general purpose of the present invention, which will be described subsequently in greater detail, is to provide a new anchoring device for an umbrella apparatus and method which has many of the advantages of the anchoring devices mentioned heretofore and many novel features that result in a new anchoring device for an umbrella which is not anticipated, rendered obvious, suggested, or even implied by any of the prior art anchoring devices, either alone or in any combination thereof.

To attain this, the present invention generally comprises a base plate that has an upper side and a lower side. A stake member mounted to a central portion of the lower side of the base plate is provided for removably penetrating the surface. A tubular member is coupled to the upper side of the base plate. The tubular member includes a first end, a second end and a peripheral wall extending between the first and second ends of the tubular member. The second end of the tubular member includes a bore extending therein toward the first end of the tubular member. In one embodiment, an end of the shaft of the umbrella is removably insertable in the bore.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new anchoring device for an umbrella apparatus and method which has many of the advantages of the anchoring devices mentioned heretofore and many novel features that result in a new anchoring device for an umbrella which is not anticipated, rendered obvious, suggested, or even implied by any of the prior art anchoring devices, either alone or in any combination thereof.

It is another object of the present invention to provide a new anchoring device for an umbrella which may be easily and efficiently manufactured and marketed.

It is a further object of the present invention to provide a new anchoring device for an umbrella which is of a durable and reliable construction.

An even further object of the present invention is to provide a new anchoring device for an umbrella which is susceptible of a low cost of manufacture with regard to both materials and labor, and which accordingly is then susceptible of low prices of sale to the consuming public, thereby making such anchoring device for an umbrella economically available to the buying public.

Still yet another object of the present invention is to provide a new anchoring device for an umbrella which provides in the apparatuses and methods of the prior art some of the advantages thereof, while simultaneously overcoming some of the disadvantages normally associated therewith.

Still another object of the present invention is to provide a new anchoring device for an umbrella for driving and securing the umbrella to a surface such as, for example, sand, or dirt.

Yet another object of the present invention is to provide a new anchoring device for an umbrella which includes a base plate that has an upper side and a lower side. A stake member mounted to a central portion of the lower side of the base plate is provided for removably penetrating the surface. A tubular member is coupled to the upper side of the base plate. The tubular member includes a first end, a second end and a peripheral wall extending between the first and second ends of the tubular member. The second end of the tubular member includes a bore extending therein toward the first end of the tubular member. In one embodiment, an end of the shaft of the umbrella is removably insertable in the bore.

Still yet another object of the present invention is to provide a new anchoring device for an umbrella that prevents the umbrella from falling over and potentially injuring an individual lying under or next to the umbrella.

Even still another object of the present invention is to provide a new anchoring device for an umbrella that allows an individual to transport and secure their umbrella to a surface in order to protect themselves from harmful ultra violet rays of the sun.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new anchoring device for an umbrella according to the present invention showing a shaft of the umbrella removably coupled to the anchoring device.

FIG. 2 is a schematic perspective view of the present invention showing a tubular member mounted on a base plate having a stake member extending downwardly from the base plate.

FIG. 6 is a schematic perspective view of an alternate embodiment of the present invention.

FIG. 7 is a schematic cross-sectional view of the alternate embodiment of the present invention.

DESCRIPTION OF THE PREFERRED EMBODIMENT

Figure 3:
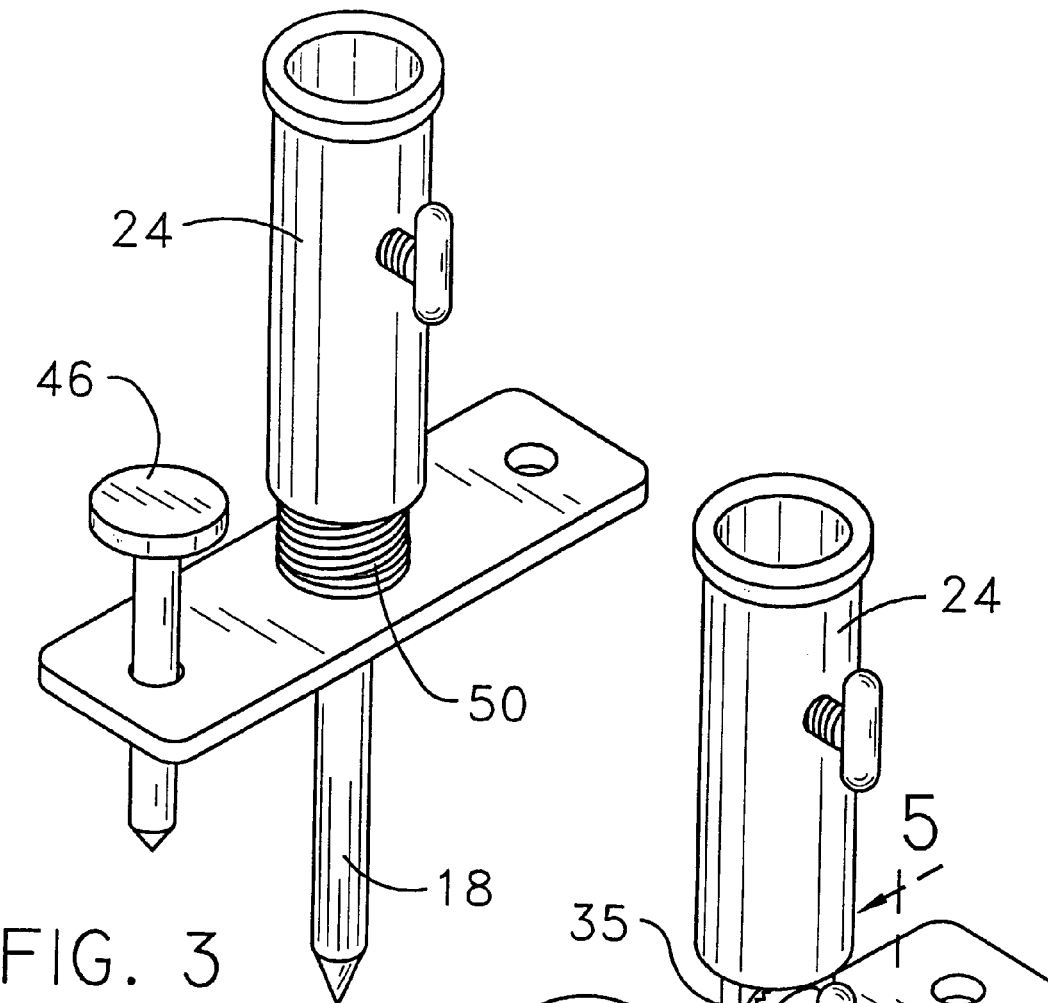
FIG. 3 is a schematic perspective view of the present invention showing a spring member connecting the tubular member to the base plate.

With reference now to the drawings, and in particular to FIGS. 1 through 10 thereof, a new anchoring device for an umbrella embodying the principles and concepts of the present invention and generally designated by the reference numeral 10 will be described.

As best illustrated in FIGS. 1 through 10, the anchoring device for an umbrella 10 generally comprises a base plate 12 that includes an upper side 13, a lower side 14 and a peripheral edge 15 extending between the upper side and the lower side. The base plate 12 also includes a pair of opposing ends 16. The base plate 12 preferably comprises a substantially rigid material such as, for example, a plastic or a metal material. The base plate 12 may have a length measuring approximately seven inches and a width measuring approximately two inches. The base plate 12 may also have a thickness measuring approximately one-quarter inch. However, the measurements of the base plate 12 may vary depending upon the size of the umbrella being used. A larger umbrella may require a base plate 12 having larger measurements.

Figure 4:
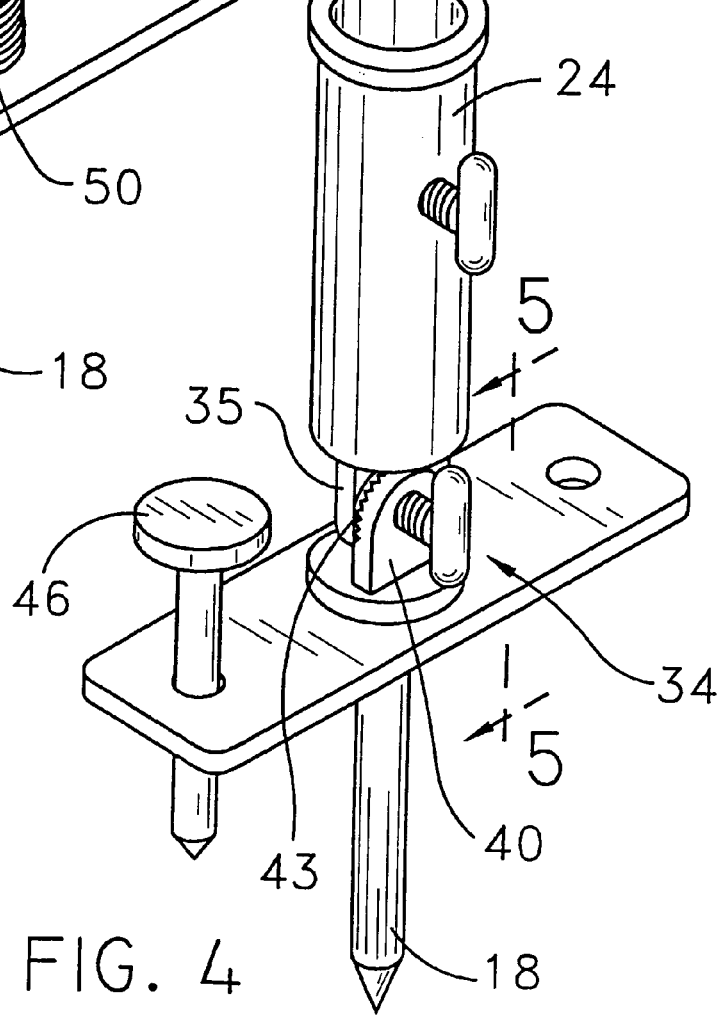
FIG. 4 is a schematic perspective view of the present invention showing a pivoting assembly connecting the tubular member to the base plate.

As illustrated in FIGS. 2, 3 and 4, a stake member 18 is provided for removably penetrating a surface such as, for example, sand or dirt. The stake member 18 secures the base plate 12 to the surface. The stake member 18 is preferably elongated for ensuring attachment of the base plate 12 to the surface. The stake member 18 has a first end 19 and a second end 20. The first end 19 of the stake member 18 is preferably mounted to a central portion of the lower side 14 of the base plate 12. The second end 20 of the stake member 18 includes a generally conical shape for facilitating insertion of the second end 20 of the stake member 18 into the surface. The stake member 18 may comprise a substantially rigid material such as, for example, a plastic or a metal material.

A tubular member 24 is provided for releasably holding a shaft of the umbrella. The tubular member 24 has a first end 25, a second end 26 and a peripheral wall 27 extending between the first 25 and second 26 ends of the tubular member 24. The first end 25 of the tubular member 24 is coupled to the upper side 13 of the base plate 12. The second end 26 of the tubular member 24 includes a bore 28 extending therein toward the first end 25 of the tubular member 24. An end of the shaft of the umbrella is removably insertable in the bore 28. The tubular member 24 may comprise a substantially rigid material such as, for example, a plastic or a metal material. The bore 28 of the tubular member 24 preferably has a diameter measuring approximately one and three-quarter inches.

A holding means 30 may be provided for releasably holding the shaft of the umbrella in the bore 28 of the tubular member 24. The holding means 30 preferably comprises a set screw member that is removably insertable into a hole 31 extending through the peripheral wall 27 of the tubular member 24. The set screw member is exteriorly threaded and the hole 31 is interiorly threaded such that the exterior threads of the set screw releasably engage the interior threads of the hole 31. The hole 31 is positioned generally nearer the first end 25 than the second end 26 of the tubular member 24.

As illustrated in FIG. 4 a pivoting assembly 34 may be provided for permitting pivoting of the tubular member 24 with respect to the base plate 12. The pivoting assembly 34 preferably comprises a first portion 35 that is mounted on the tubular member 24. The first portion 35 extends downwardly from the first end 25 of the tubular member 24. The first portion 35 includes a front side 36 and a back side 37. The front side 36 of the first portion 35 includes a plurality of radially extending teeth 38 formed therein.

The pivoting assembly 34 also preferably comprises a second portion 40 that is mounted on the base plate 12. The second portion 40 extends upwardly from the upper side 13 of the base plate 12. The second portion 40 includes a first side 41 and a second side 42. The first side 41 of the second portion 40 includes a plurality of radially extending teeth 43 formed therein. Each of the teeth 43 of the second portion 40 is selectively interlockable with spaces between the teeth 38 of the first portion 38.

Figure 5:
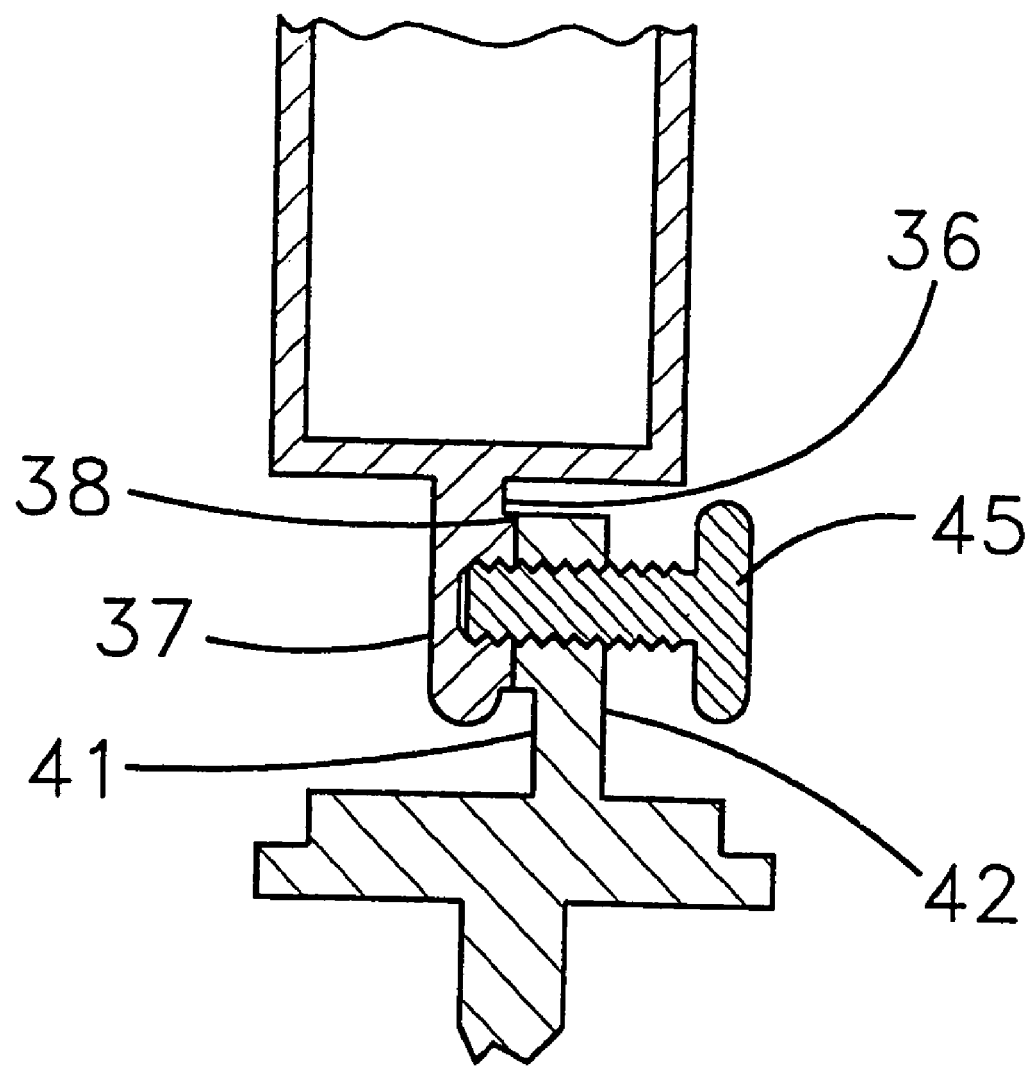
FIG. 5 is a schematic cross-sectional view of the present invention taken along line 5—5 of FIG. 4 showing a first portion of the pivoting assembly movably engaged with a second portion of the pivoting assembly.

As illustrated in FIGS. 4 and 5, a fastening member 45 may be provided for fastening the first portion 35 to the second portion 40 in a selected position. As particularly illustrated in FIG. 5, the fastening member 45 preferably extends through the second portion 40 and into the first portion 35. In one embodiment, the first 35 and second 40 portions have an interlocked position characterized by the portions 35 and 40 not being rotatable with respect to each other and a released position characterized by the portions 35 and 40 being rotatable with respect to each other.

A pair of auxiliary securing spikes 46 may be provided for securing the base plate 12 to the surface. Each of the auxiliary securing spikes 46 is preferably positioned generally adjacent to one of the ends 16 of the base plate 12. A first end 47 of each of the auxiliary securing spikes 46 is removably extendable through the upper side 13 of the base plate 12 and into the surface. Each of the auxiliary securing spikes is adapted for preventing the base plate 12 and the stake member 18 from rotating in the surface.

In another embodiment, as particularly illustrated in FIG. 3, a spring member 50 may be provided for connecting the base plate 12 to the tubular member 24 to permit a rocking movement of the tubular member 24 with respect to the base plate 12. The spring member 50 may comprise a coiled spring.

In yet another embodiment of the present invention, as particularly illustrated in FIGS. 6 and 7, a coupling assembly 52 extends between and is coupled to the base plate 12 and the tubular member 24 for pivotally coupling the tubular member 24 to the base plate 12.

In one embodiment of the present invention, the coupling assembly includes a guide member 53 for guiding pivotal movement of the tubular member 24 with respect to the base plate 12. The guide member 53 is preferably mounted on the upper side of the base plate 12. The guide member 53 may comprise a substantially rigid material such as, for example, a plastic or metal material.

The coupling assembly may also include a bracket 54 for coupling the tubular member 24 to the guide member 53. The bracket 54 preferably extends between and is coupled to the tubular member 24 and the guide member 53. In one embodiment of the present invention, the guide member 53 includes a plurality of holes 55 extending through a pair of lateral side surfaces 55 of the guide member 24. In one embodiment of the present invention, the guide member 53 may have a generally arcuate shape, however, the guide member 53 may employ a variety of shapes.

In one embodiment of the present invention, the bracket 54 includes a support portion 56 for supporting the tubular member 24 above the base plate 12. The bracket 54 additionally includes a connecting portion 57 for pivotally connecting the bracket 54 to the guide member 53. An end 58 of the connecting portion 57 is preferably pivotally coupled to the guide member 53.

A securing member 60 may be provided for securing the tubular member 24 in a position with respect to the base plate 12. The securing member 60 may be slidably mounted through the connecting portion 57 with an end 61 of the securing member 60 being retractably extendable through one of the holes 55 extending through the guide member 53.

In one embodiment of the present invention, an annular lip 64 is formed on a portion of the securing member 60. The annular lip 64 is preferably positioned generally between the guide member 53 and the connecting portion 57 of the bracket 54. In one embodiment of the present invention, the securing member 60 may comprises a pin.

A biasing member 66 may be provided for biasing the end 61 of the securing member 60 away from the connecting portion 57 of the bracket 54 and for extending the end 61 of the securing member 60 through one of the holes 55 in the guide member 53. The biasing member 66 may be mounted about the securing member 60 and positioned between the annular lip 64 formed on the securing member 60 and the connecting portion 57 of the bracket 54.

A second stake member 70 may be tethered to the peripheral wall 27 of the tubular member 24 for additionally securing the tubular member 24 to a surface. The second stake member 70 may be tether by a chain or a rope.

A cap 71 may be provided for selectively covering the bore 28 extending into the tubular member 24. An annular edge of the cap 71 may selectively engage the peripheral wall 27 of the tubular member 24. The cap 71 may comprise a generally flexible material such as, for example, a plastic material. The cap 71 may comprise a substantially rigid material such as, for example, a metal or plastic material.

Figure 8:
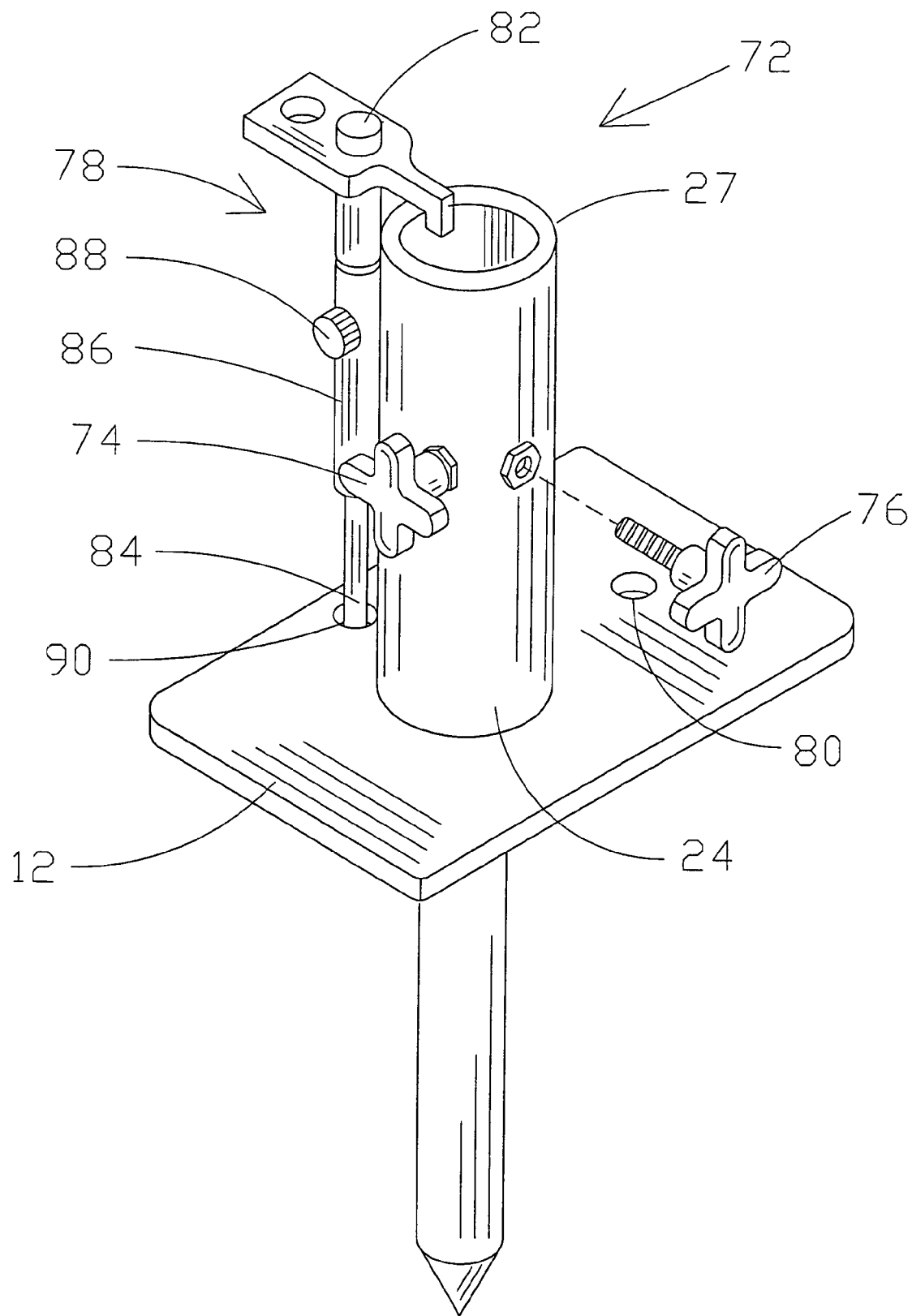
FIG. 8 is a schematic perspective view of an embodiment of the present invention.
Figure 9:
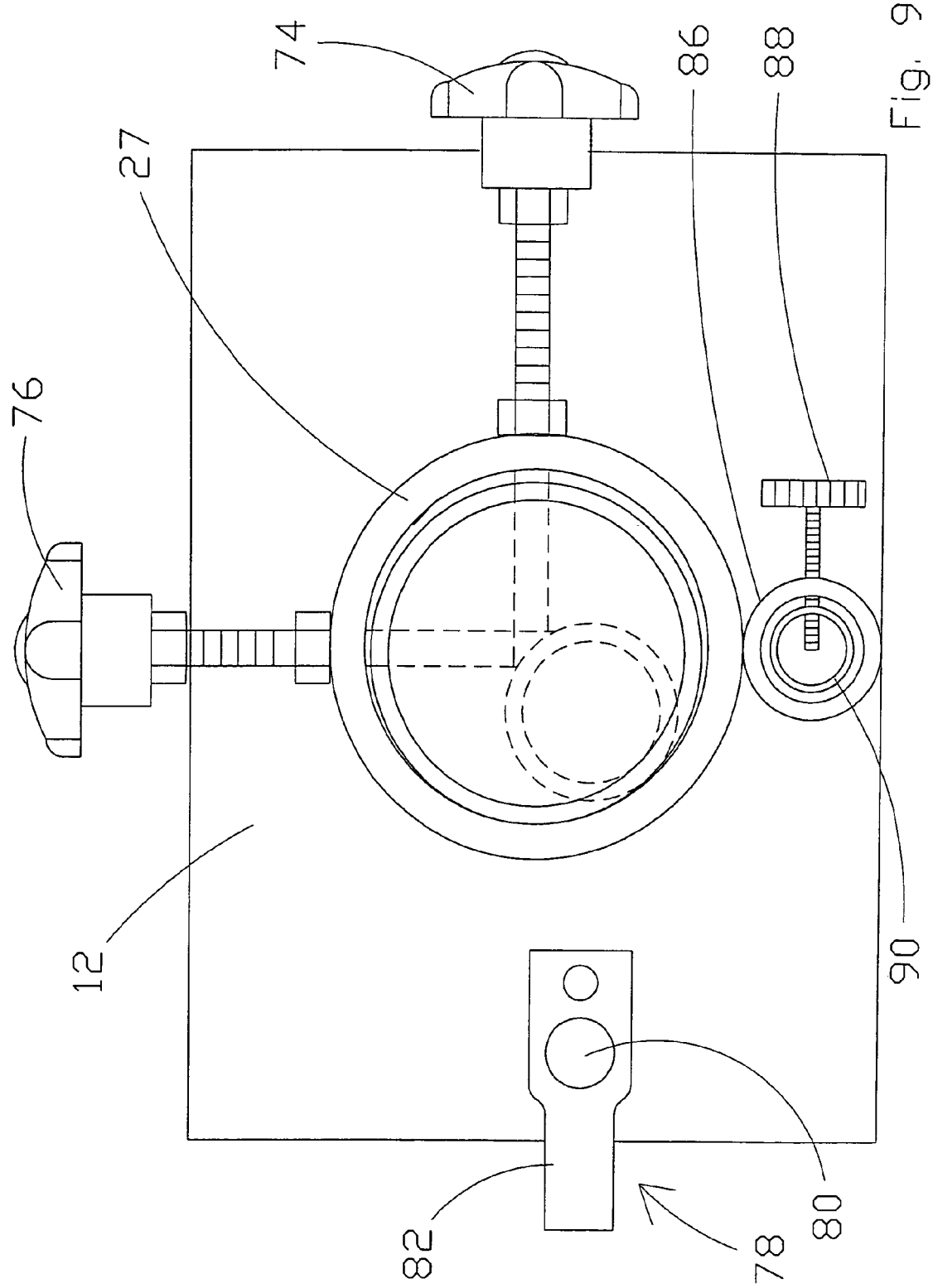
FIG. 9 is a schematic top view of the embodiment of FIG. 8.
Figure 10:
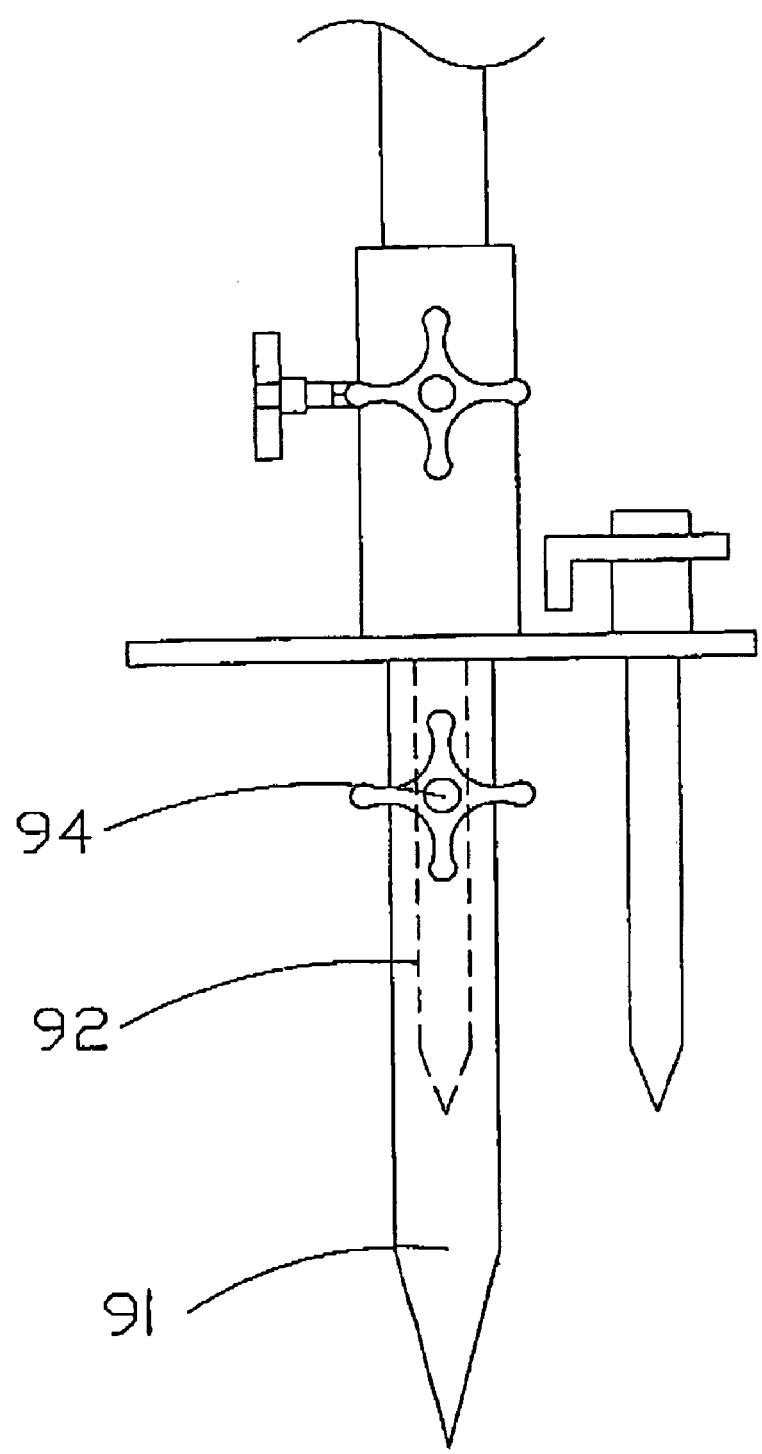
FIG. 10 is a schematic side view of the present invention showing an adaptor removably mounted on the stake.

In another embodiment of the invention shown in FIGS. 8 and 9, the anchoring device 72 includes a first set screw 74 is threadedly mounted on a hole extending through the peripheral wall 27 of the tubular member 24. A second set screw 76 may be threadedly mounted on a second hole extending through the peripheral wall 27 on the tubular member 24. In one embodiment of the invention, the second set screw 76 may extend along an axis that is oriented substantially perpendicular to an axis of the first set screw 74.

An auxiliary securing spike 78 may be provided for securing the base plate 12 to the surface. The base plate 12 may have an aperture 80 for removably receiving the auxiliary securing spike 78 for driving the securing spike into the surface. The auxiliary securing spike 78 may have a head 82 mounted on one end of a shaft 84 of the auxiliary securing spike 78. The head 82 may be enlarged with respect to the shaft 84 and may have a dimension greater than a maximum dimension of the aperture 80 in the base plate 12.

A sleeve 86 may be mounted on the tubular member 24 for holding the auxiliary securing spike 78 when the securing spike 78 is not received in the aperture 80 in the base plate 12. A set screw 88 may be mounted on the sleeve 86 for selectively abutting the auxiliary securing spike 78 when the securing spike 78 is positioned in the sleeve 86. An auxiliary aperture 90 may be formed in the base plate 12 and may be aligned with a passage through the sleeve 86 such that the auxiliary securing spike 78 is extendable through the auxiliary aperture 90 when the auxiliary securing spike is positioned in the sleeve 86.

As an optional feature, the present invention may also include an adapter 91 for adapting the various embodiments of the invention for use in relatively softer or less compacted ground materials, such as, for example, beach sand. The adapter 91 fits over the end of the stake member 18 of the invention. Preferably, the adapter 91 includes a bore 92 for removably receiving the stake member 18, and a set screw 94 that may be screwed into abutment with the stake member to hold the adapter 91 to the stake member. The adapter 91 thus increases the effective length of the stake member 18 to effect a greater ground penetration that can help to hold the invention upright in softer ground materials.

In use, the umbrella may be pivotally adjusted to a desirable position for blocking such natural elements as the wind or the sun. In an embodiment having a spring member 50 any force, such as wind, that is exerted upon the umbrella will be absorbed by the spring member 50 reducing the likelihood of the base plate 12 and the stake member 18 being uplifted from the surface. In an alternate embodiment of the present invention, a user may secure the tubular member 24 in a position with respect to base plate.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An anchoring device for anchoring an umbrella to a surface, the umbrella having a canopy attached to an end of a shaft, the device comprising:
   a base plate having an upper side and a lower side;
   a stake member for removably penetrating the surface, a first end of the stake member being mounted on the lower side of the base plate and extending away from the lower side of the base plate;
   a tubular member having a first end, a second end, and a peripheral wall extending between the first and second ends of the tubular member, the first end of the tubular member being coupled to the upper side of the base plate, the second end of the tubular member having a bore extending therein toward the first end of the tubular member for removably receiving an end of the shaft of the umbrella; and
   holding means for releasably holding the shaft of the umbrella in the bore of the tubular member;
   an auxiliary securing spike for securing the base plate to the surface, the base plate having an aperture for removably receiving the auxiliary securing spike for driving the securing spike into the surface;
   a sleeve mounted on the tubular member for holding the auxiliary securing spike when the securing spike is not received in the aperture in the base plate; and
   an auxiliary aperture formed in the base plate, the auxiliary aperture being aligned with a passage through the sleeve such that the auxiliary securing spike is extendable through the auxiliary aperture when the auxiliary securing spike is positioned in the sleeve.

2. The anchoring device of claim 1 wherein the holding means comprises a set screw being threadedly mounted on a hole extending through the peripheral wall of the tubular member.

3. The anchoring device of claim 1 wherein the auxiliary securing spike has a head mounted on one end of a shaft of the auxiliary securing spike, the head being enlarged with respect to the shaft and having a dimension greater than a maximum dimension of the aperture in the base plate.

4. The anchoring device of claim 1 additionally comprising a set screw mounted on the sleeve for selectively abutting the auxiliary securing spike when the securing spike is positioned in the sleeve.

5. An anchoring device for anchoring an umbrella to a surface, the umbrella having a canopy attached to an end of a shaft, the device comprising:
   a base plate having an upper side and a lower side;
   a stake member for removably penetrating the surface, a first end of the stake member being mounted on the lower side of the base plate and extending away from the lower side of the base plate;
   a tubular member having a first end, a second end, and a peripheral wall extending between the first and second ends of the tubular member, the first end of the tubular member being coupled to the upper side of the base plate, the second end of the tubular member having a bore extending therein toward the first end to the tubular member for removably receiving an end of the shaft of the umbrella;
   holding means for releasably holding the shaft of the umbrella in the bore of the tubular member;
   wherein the holding means comprises a set screw being threadedly mounted on a hole extending through the peripheral wall of the tubular member; and
   wherein the holding means comprises a set screw being threadedly mounted on a hole extending through the peripheral wall of the tubular member;
   wherein the set screw comprises a first set screw, and additionally comprising a second set screw being threadedly mounted on a second hole extending through the peripheral wall on the tubular member, the second set screw extending along an axis that is oriented substantially perpendicular to an axis of the first set screw;
   an auxiliary securing spike for securing the base plate to the surface, the base plate having an aperture for removably receiving the auxiliary securing spike for driving the securing spike into the surface;
   wherein the auxiliary securing spike has a head mounted on one end of a shaft of the auxiliary securing spike, the head being enlarged with respect to the shaft and having a dimension greater than a maximum dimension of the aperture in the base plate;

a sleeve mounted on the tubular member for holding the auxiliary securing spike when the securing spike is not received in the aperture in the base plate;

a set screw mounted on the sleeve for selectively abutting the auxiliary securing spike when the securing spike is positioned in the sleeve; and an auxiliary aperture formed in the base plate, the auxiliary aperture being aligned with a passage through the sleeve such that the auxiliary securing spike is extendable through the auxiliary aperture when the auxiliary securing spike is positioned in the sleeve.

\* \* \* \* \*